(12) United States Patent
Huelke et al.

(10) Patent No.: US 9,783,133 B2
(45) Date of Patent: Oct. 10, 2017

(54) MAGNET FASTENER WITH RESILIENT SUPPORT INCLUDING AT LEAST ONE PROJECTION

(71) Applicant: FORD GLOBAL TECHNOLOGIES, LLC, Dearborn, MI (US)

(72) Inventors: David Huelke, Milan, MI (US); Mike Popovski, Utica, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 14/479,722

(22) Filed: Sep. 8, 2014

(65) Prior Publication Data

US 2016/0068117 A1  Mar. 10, 2016

(51) Int. Cl.
| | |
|---|---|
| *B60R 13/01* | (2006.01) |
| *B60R 13/02* | (2006.01) |
| *A44B 17/00* | (2006.01) |
| *B60R 13/04* | (2006.01) |
| *F16B 1/00* | (2006.01) |
| *H01F 7/02* | (2006.01) |
| *B60R 11/00* | (2006.01) |

(52) U.S. Cl.
CPC ...... *B60R 13/0275* (2013.01); *A44B 17/0023* (2013.01); *A44B 17/0047* (2013.01); *B60R 13/0206* (2013.01); *B60R 13/0212* (2013.01); *B60R 13/04* (2013.01); *F16B 1/00* (2013.01); *H01F 7/0252* (2013.01); *B60R 2011/0057* (2013.01); *F16B 2001/0035* (2013.01)

(58) Field of Classification Search
CPC ............ B60R 13/0206; B60R 13/0212; B60R 13/0218; B60R 13/0225; B60R 13/0275; F16B 5/0657; F16B 5/0621; F16B 5/065; F16B 2001/0035; F16B 1/00; A44B 17/0047; Y10T 24/32; Y10T 24/304; Y10T 24/309; H01F 7/0263; H01F 7/0252

USPC ......................................................... 24/303
See application file for complete search history.

(56) References Cited

U.S. PATENT DOCUMENTS

| | | | |
|---|---|---|---|
| 6,675,940 B2 | 1/2004 | Maurice | |
| 7,475,934 B2 | 1/2009 | Sato et al. | |
| 7,922,135 B2 | 4/2011 | Granata | |
| 7,986,206 B2 | 7/2011 | Maddocks et al. | |
| 8,465,087 B2 | 6/2013 | Gerwolls et al. | |
| 8,555,468 B2 | 10/2013 | Moerke | |
| 2004/0258471 A1* | 12/2004 | Granata | B60R 13/0206 403/381 |
| 2009/0211065 A1* | 8/2009 | Moerke | B60R 13/0206 24/303 |

(Continued)

FOREIGN PATENT DOCUMENTS

| | | |
|---|---|---|
| JP | 2011073653 A | 4/2011 |
| WO | 03/070530 A1 | 8/2003 |

OTHER PUBLICATIONS

English Machine Translation of JP2011073653.

*Primary Examiner* — Jack W Lavinder
(74) *Attorney, Agent, or Firm* — Vichit Chea; King & Schickli, PLLC

(57) ABSTRACT

A magnet fastener includes a cup, a magnet received in the cup and a carrier. The carrier receives and holds the cup while the resilient support includes at least one projection that engages the cup and provides a biasing force to prevent rattling or ticking of the cup on the carrier.

15 Claims, 6 Drawing Sheets

(56) References Cited

U.S. PATENT DOCUMENTS

2014/0001322 A1 1/2014 Joyce et al.
2014/0103771 A1 4/2014 Figgins et al.

* cited by examiner

MAGNET FASTENER WITH RESILIENT SUPPORT INCLUDING AT LEAST ONE PROJECTION

TECHNICAL FIELD

This document relates generally to the fastener field and, more particularly, to a magnet fastener having a resilient, substantially planar base and at least one projection that essentially eliminates ticking and rattling.

BACKGROUND

Magnet fasteners or clips are well known in the art and are often utilized to fasten body panels and automobile interior trim piece panels, such as a headliner, to the body or chassis of a vehicle. Such fasteners must allow for articulation in order to accommodate manufacturing tolerances and/or irregular body contours so as to provide proper fastening.

U.S. Pat. Nos. 7,306,190 and 8,287,034 disclose state-of-the-art magnet fasteners. The '190 patent relates to a fastener including a magnet that is held in a carrier that is loosely fitted onto a post in order to allow for tilt or articulation as often required to provide substantially flush engagement against a substrate such as a roof to which a trim piece is to be mounted.

Similarly, the '034 patent discloses a magnet mounted in a holder that is captured on a boss. A gap is provided between the boss and the holder so as to allow relative movement of the holder on the boss and articulation of the magnet.

It should be appreciated that the magnet holders disclosed in the '190 and '034 patents are made of multiple pieces that move relative to each other in order to provide articulation. These devices must be carefully manufactured under tight tolerances to allow proper assembly and operation. Even when properly manufactured, the relative movement of the parts may lead to a ticking or rattling sound that can be particularly annoying to a vehicle operator. When one realizes that these fasteners are often utilized to attach a headliner to the vehicle roof, it is appreciated that this ticking or rattling occurs in the proximity of the ears of the vehicle occupants. Often the ticking or rattling is so annoying the dissatisfied vehicle operator brings the vehicle in for service to address and prevent the unwanted sound. The removal and replacement of a headliner is a time-consuming and costly repair. Further, the resulting customer dissatisfaction of the operator with the vehicle brand is a critical concern.

U.S. Pat. No. 8,555,468 discloses a magnet fastener including protuberances on small spring supports that project above the floor of the cup which contacts and holds the magnet assembly so as to bias the bottom of the cup into tabs on the post so as to prevent rattling. While useful for its intended purpose, the relatively small spring supports have a limited cross section that only provides for limited biasing force and the resiliency of the material tends to wane over time.

This document relates to a new and improved magnet fastener of unitary construction which substantially eliminates any possibility of the fastener ticking or rattling when in use even over a long service life.

SUMMARY

In accordance with the purposes and benefits described herein, a magnet fastener is provided. That magnet fastener comprises a cup, a magnet received in the cup and a carrier. The carrier includes a base and a resilient support. The resilient support includes at least one projection engaging the cup.

Still more specifically describing the magnet fastener, the resilient support is substantially planar. Further, in one possible embodiment the resilient support includes an integral stem and lock. The cup includes an aperture received around the stem and captured between the resilient support and the lock. In yet another possible embodiment, the resilient support comprises a planar disk made from resilient material and having a surface facing the cup. At least one projection projects from the surface toward the cup. Engagement between the projection and the cup deflects the planar disk causing the resilient material of the disc to provide a force biasing the cup on the stem into positive engagement with the lock whereby the cup is securely and forcefully held in place so as to prevent rattling of the cup on the carrier.

In one possible embodiment, the surface is continuous. Further, the projection comprises two opposed ribs on the surface of the disk. In addition the magnet is annular in shape and includes a central opening.

In accordance with an additional aspect a headliner assembly is provided comprising a headliner and the magnet fastener described herein.

In the following description, there are shown and described several preferred embodiments of the magnet fastener. As it should be realized, the magnet fastener is capable of other, different embodiments and its several details are capable of modification in various, obvious aspects all without departing from the magnet fastener as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the magnet fastener and together with the description serve to explain certain principles thereof. In the drawings.

Figure 1:
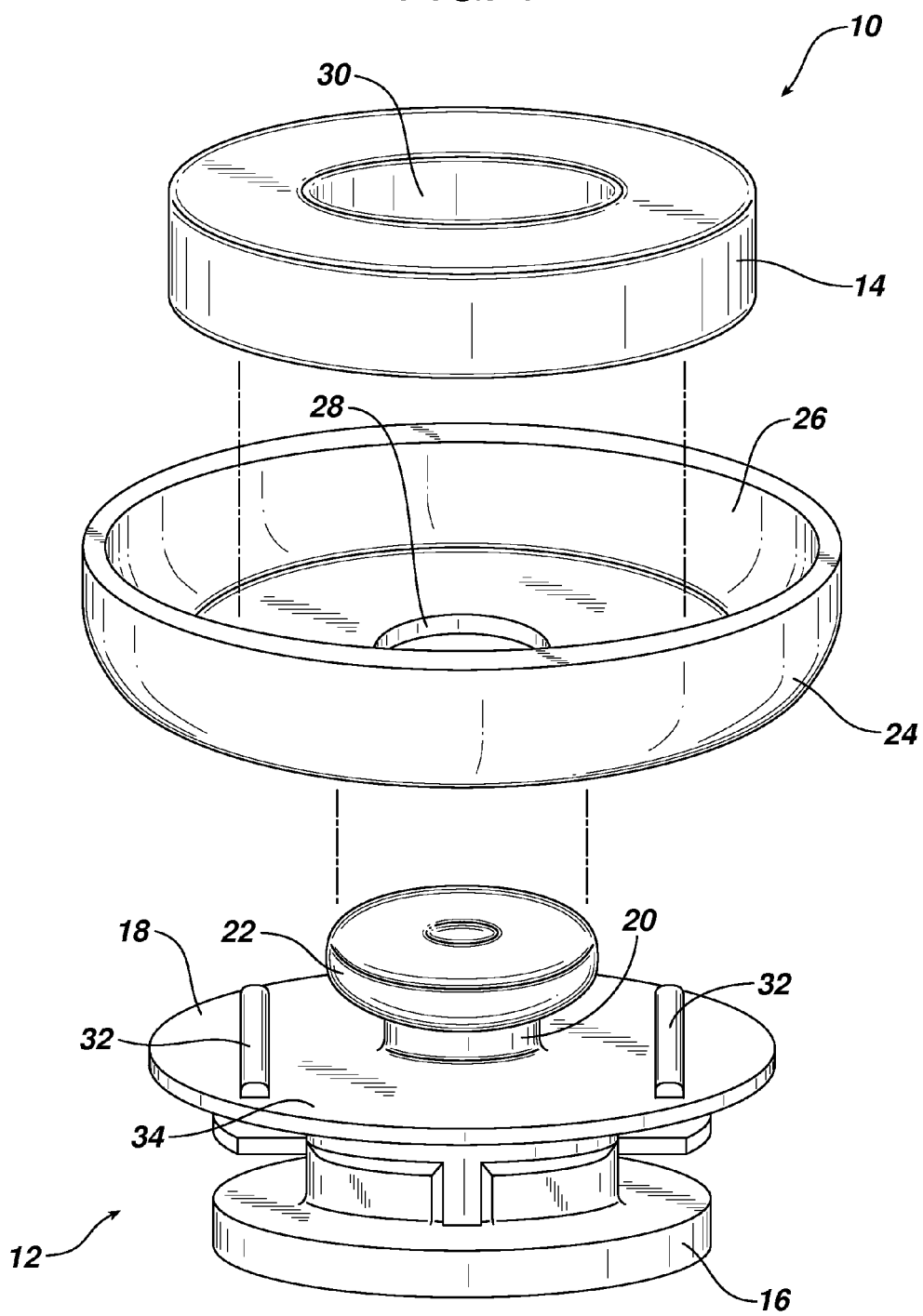
FIG. 1 is an exploded perspective view of the magnet fastener.

Reference will now be made in detail to the present preferred embodiment of the magnet fastener, examples of which are illustrated in the accompanying drawing figures.

DETAILED DESCRIPTION

Reference is now made to FIGS. 1-5 illustrating the magnet fastener 10. The magnet fastener 10 includes a carrier 12 and a magnet 14. More specifically, in one embodiment, the carrier 12 includes a base 16, a resilient support 18, a stem 20 and a lock 22. In the illustrated embodiment, the resilient support 18 comprises a continuous, planar disk. It should be appreciated that the resilient support 18 does not include any form of sidewall which would add excessive rigidity to the support 18 and limit the possibility of applying a sufficient biasing force to the cup 24 so as to prevent ticking and rattling as described.

In one possible embodiment, the carrier 12 is a unitary construction and made from a single piece of plastic material. In one possible embodiment, the unitary carrier 12 is made from polypropylene. In another possible embodiment, the unitary carrier 12 is made from ABS. In other embodiments, it is made from other appropriate plastic materials having the desired resilient properties.

Figure 4:
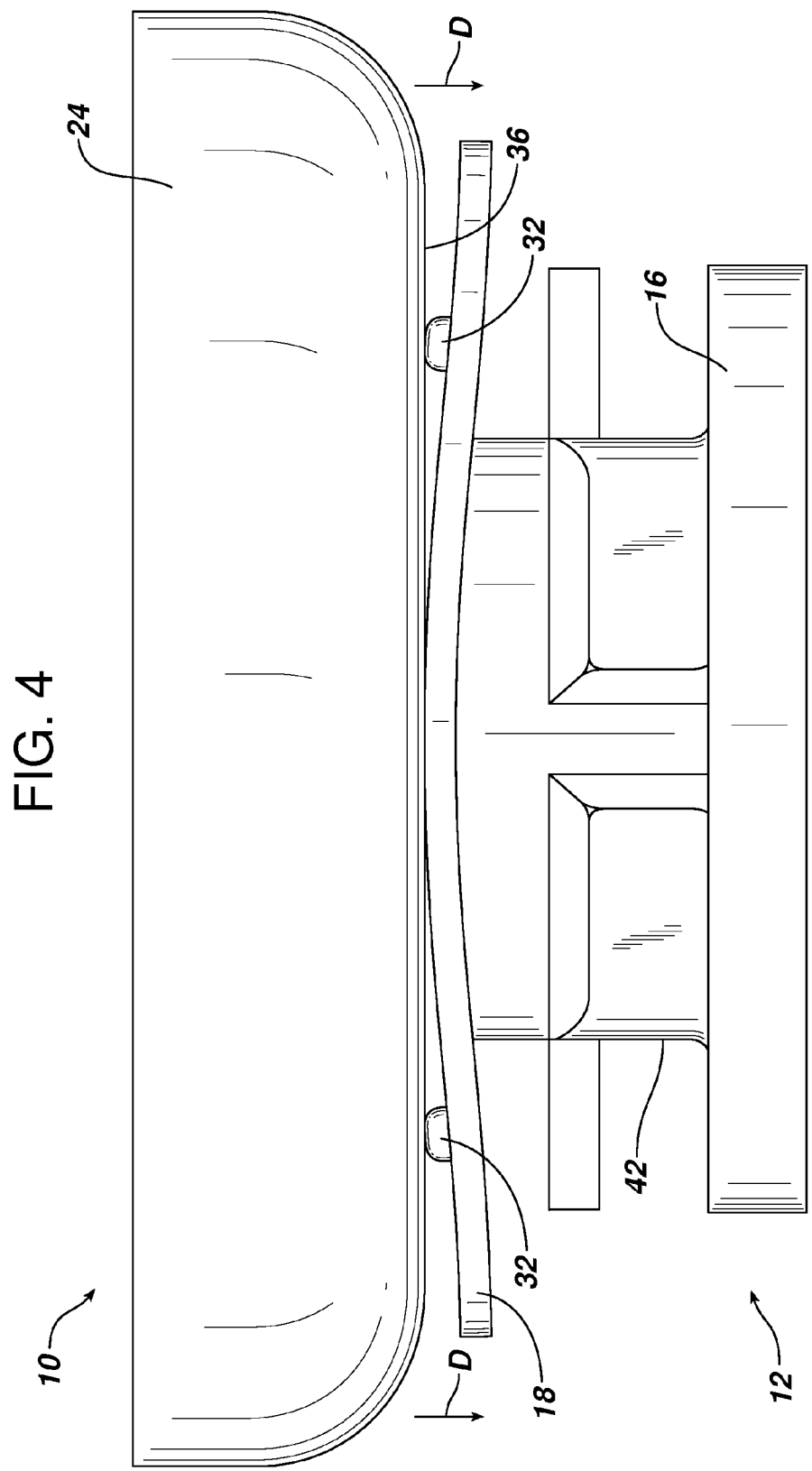
FIG. 4 is a side elevational view illustrating the cup held on the carrier including the projections engaging the cup and deflecting the planar disk of the carrier causing the resilient material of the disk to provide force that biases the cup on the stem into engagement with the lock whereby the cup is securely and positively held in place so as to prevent rattling of the cup on the carrier.
Figure 5:
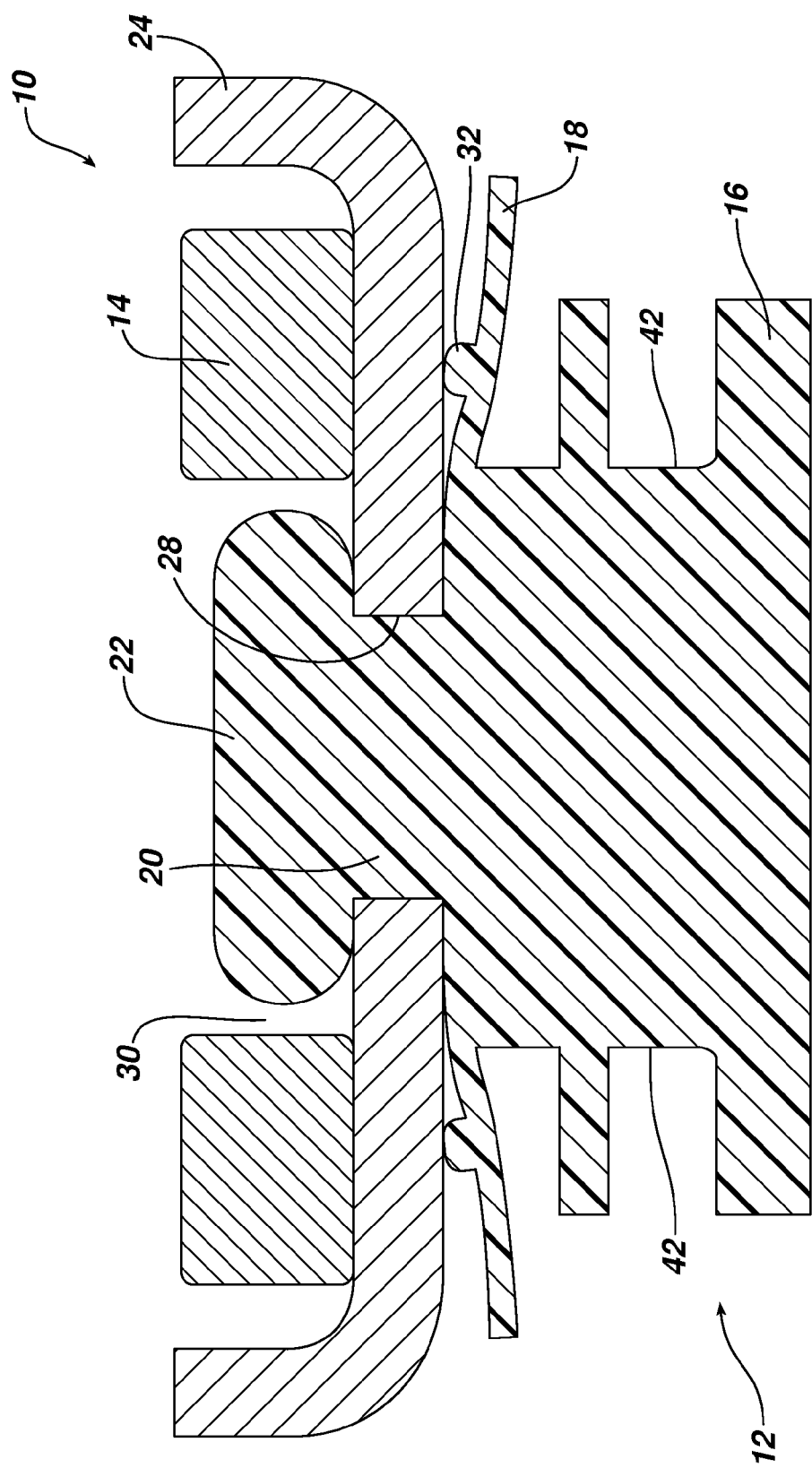
FIG. 5 is a cross-sectional view similar to FIG. 4.

As illustrated in FIGS. 1 and 4-6, the magnet fastener 10 also includes a cup 24. In one possible embodiment, the cup 24 is made from a ferromagnetic material. As best illustrated in FIGS. 1 and 5, the cup 24 includes a bowl or cavity 26 that receives and holds a magnet 14. Further the cup 24 includes a central aperture 28 that is received around the stem 20 and is captured between the lock 22 and the resilient support 18.

As further illustrated in drawing FIGS. 1 and 5, the magnet 14 is annular in shape and includes an opening 30. When the magnet 14 is mounted in the recess or cavity 26 of the cup 24, and held in the cup by the force of magnetic attraction, the opening 30 is received over the integral lock 22 of the carrier 12.

Figure 2:
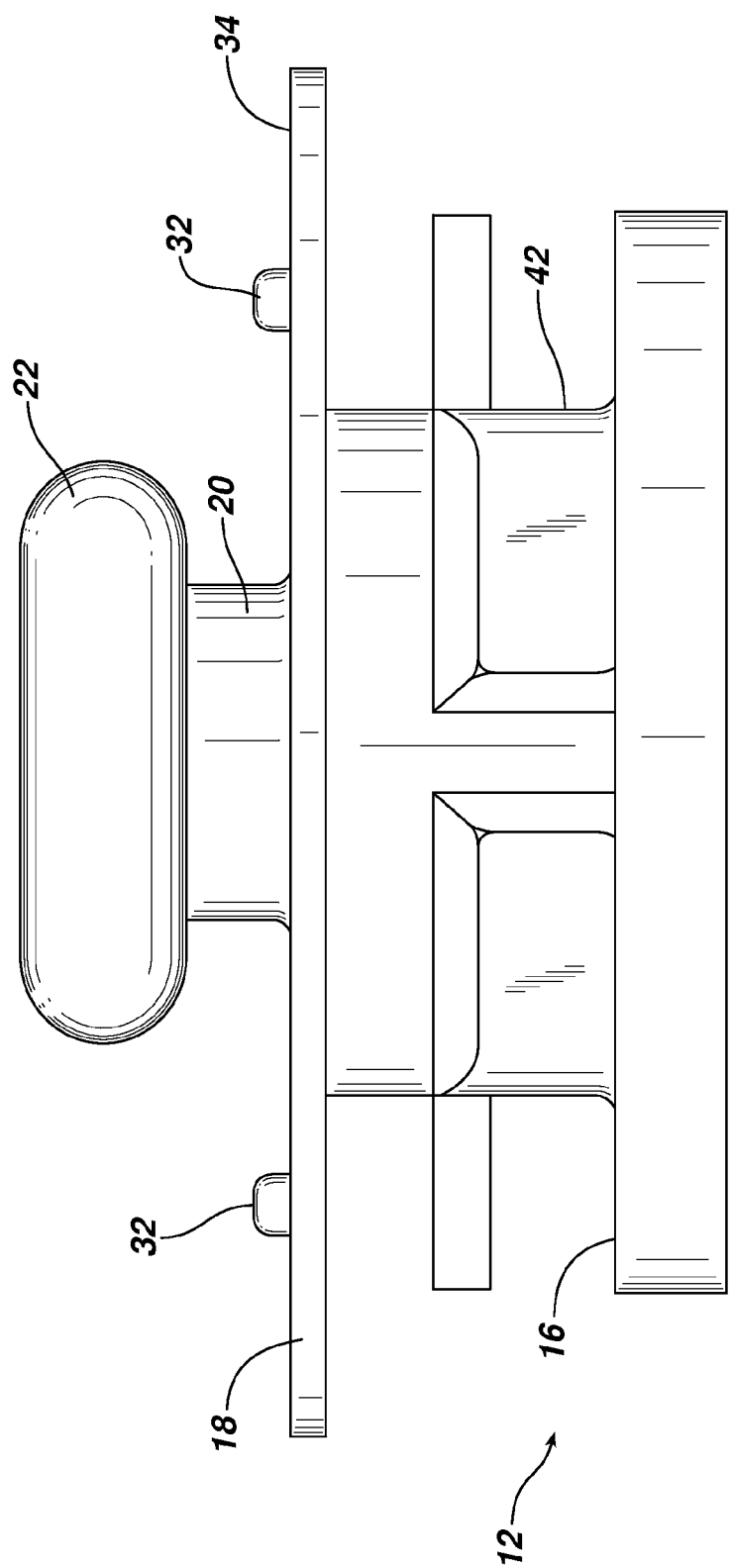
FIG. 2 is a detailed side elevational view of the carrier of the magnet fastener.
Figure 3:
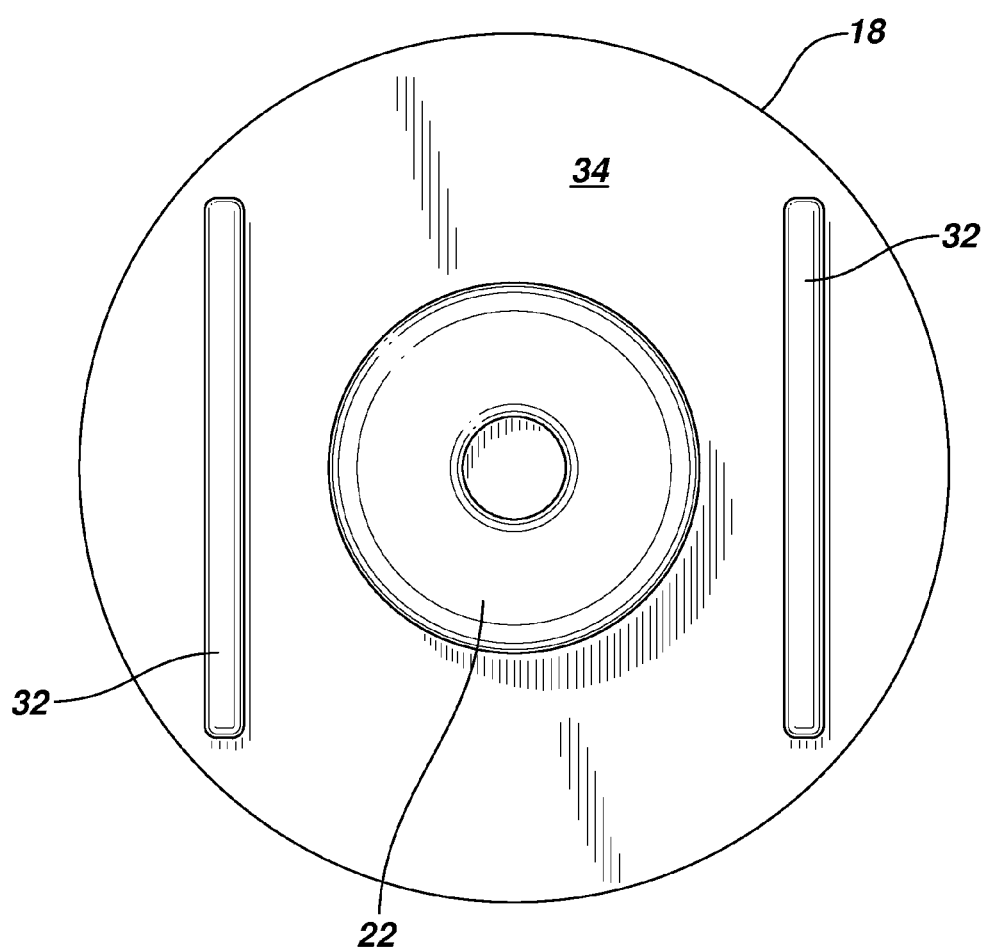
FIG. 3 is a top plan view of the carrier illustrated in FIG. 2.

As should be appreciated from viewing FIGS. 1-3, at least one projection 32 is provided on the upper, continuous surface 34 of the resilient support 18. In the illustrated embodiment the projection 32 comprises two, parallel ribs. It should be appreciated, however, that the projection 32 could comprise substantially any other appropriate structure including a continuous or interrupted arc, a line of dimples, an arc of dimples or other appropriate structures.

As best illustrated in FIGS. 4 and 5, when the cup 24 is properly seated on the carrier 12, the projections 32 engage the bottom wall 36 of the cup 24 so as to cause the resilient support 18 to be deflected downwardly (note action arrows D in the drawing FIG. 4). The resilient memory of the material from which the support 18 and is made thereby provides a force that biases the cup 24 upwardly on the stem 20 into positive engagement with the lock 22. As a result, the cup 24 is securely and positively held in place so as to prevent any rattling or ticking of the cup on the carrier 12. Advantageously, the continuous and relatively large cross-sectional area of the resilient support 18 ensures that a strong biasing force is provided over a long service life so that any ticking and rattling of the magnet fastener 10 is prevented for the life of the vehicle in which the fastener is used.

Figure 6:
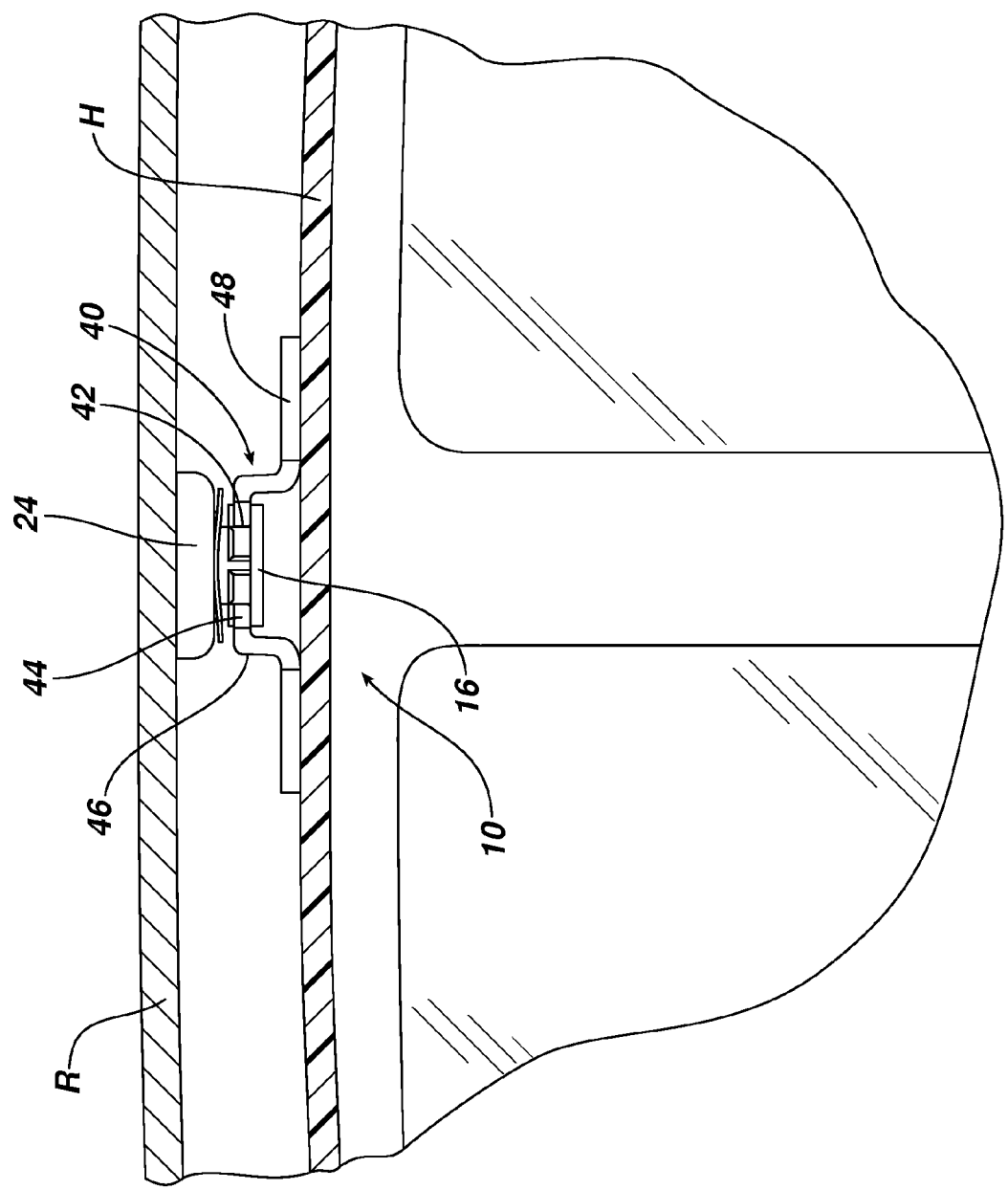
FIG. 6 is a fragmentary detailed cross-sectional view illustrating how the magnet fastener is utilized to attach a headliner to the roof of a vehicle.

Reference is now made to FIG. 6 which illustrates the magnet fastener 10 as used to hold a headliner H to the roof R of a vehicle. As illustrated, the magnet fastener 10 is secured to a doghouse 40 by sliding the channel or groove 42 formed in the carrier 12 into a slot 44 on the mounting boss 46 of the doghouse so as to provide a tight friction fit. The base 48 of the doghouse 40 is then secured with an appropriate adhesive to the headliner H. The headliner H is then positioned relative to the roof R.

More specifically, the magnet 14 held in the cup 24 is used to make a blind connection to the roof R of the vehicle. The resilient material from which the carrier 12 and support 18 are formed allows for any necessary articulation of the cup 24 and magnet 14 held therein to bring the magnet into flush contact with the roof R so as to ensure a good connection. While only one magnet fastener 10 is illustrated in FIG. 6, it should be appreciated that more than one may be used for securing headliner H to the roof R.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A magnet fastener, comprising:
   a cup;
   a magnet received in said cup; and
   a carrier including a base and a resilient support including a planar disc that receives and holds said cup, said resilient support including at least one projection engaging said cup, wherein said resilient support has a substantially flat upper surface not including any sidewalls extending from the upper surface to prevent excess rigidity to said resilient support.

2. The magnet fastener of claim 1, wherein said resilient support is substantially planar.

3. The magnet fastener of claim 2, wherein said carrier includes an integral stem and lock.

4. The magnet fastener of claim 3, wherein said cup includes an aperture received around said stem and captured between said resilient support and said lock.

5. The magnet fastener of claim 4, wherein said upper surface faces said cup.

6. The magnet fastener of claim 5, wherein said at least one projection projects from said upper surface toward said cup.

7. The magnet fastener of claim 6, wherein engagement between said at least one projection and said cup deflects said planar disc causing said resilient material of said disc to provide a force biasing said cup on said stem into engagement with said lock whereby said cup is securely and positively held in place so as to prevent rattling of said cup on said carrier.

8. The magnet fastener of claim 7, wherein said upper surface is continuous.

9. The magnet fastener of claim 8, wherein said magnet is annular in shape and includes a central opening.

10. The magnet fastener of claim 7, wherein said at least one projection comprises two opposed ribs on said upper surface of said disc.

11. The magnet fastener of claim 10, wherein said magnet is annular in shape and includes a central opening.

12. The magnet fastener of claim 10, wherein said upper surface is continuous.

13. The magnet fastener of claim 12, wherein said at least one projection projects from said upper surface toward said cup whereby engagement of said cup by said at least one projection deflects said resilient support so as to produce a biasing force to securely and positively hold said cup in place on said carrier and prevent rattling.

14. A headliner assembly comprising a headliner and said magnet fastener of claim 2.

15. A headliner assembly comprising a headliner and said magnet fastener set forth in claim 1.

* * * * *